United States Patent [19]

Prelletz et al.

[11] Patent Number: 4,476,506
[45] Date of Patent: Oct. 9, 1984

[54] CASSETTE HANDLING APPARATUS WITH IMPROVED CONTROL ARRANGEMENT

[75] Inventors: Edward R. Prelletz, Chicago, Ill.; Gerald D. Warden, Easton, Pa.

[73] Assignee: Bell & Howell Company, Chicago, Ill.

[21] Appl. No.: 336,472

[22] Filed: Dec. 31, 1981

[51] Int. Cl.³ .............................................. G11B 15/66
[52] U.S. Cl. ..................................................... 360/96.6
[58] Field of Search ................... 360/83, 90, 95, 96.5, 360/96.6; 242/188–200

[56] References Cited

U.S. PATENT DOCUMENTS

| | | | |
|---|---|---|---|
| 4,017,900 | 4/1977 | Katsurayana | 360/137 |
| 4,209,812 | 6/1980 | Umezawa et al. | 242/201 X |
| 4,323,937 | 4/1982 | Santoro | 360/96.6 |

FOREIGN PATENT DOCUMENTS

| | | | |
|---|---|---|---|
| 5518303 | 2/1977 | Japan | 360/96.6 |
| 2027973 | 2/1980 | United Kingdom | 360/96.6 |

*Primary Examiner*—George G. Stellar
*Attorney, Agent, or Firm*—James V. Lapacek; Stanley Tomsa; Robert J. Schneider

[57] ABSTRACT

An edge loading cassette holder/loader utilizes an improved ejector/release control arrangement wherein the cassette is loaded narrow end first through a loading receiver opening into a holder/loader platform. The control arrangement includes a first pivotally mounted control arm that is biased to pivot the arm to partially eject the cassette for removal and that also functions as a release control member for the platform. A second pivotally mounted control arm that moves with the first arm and functions as a release member for the platform is also provided. The platform is pivotally movable between an upper loading position and a lower operative position wherein the cassette hub sprockets are engaged by transport drive spindles. The platform is biased to the lower operative position and is moved to the upper loading position by the second control arm. As the cassette is inserted into the platform, the cassette engages the first control arm and pivots the first and second control arms until the second control arm releases the platform to the lower operative position. In the operative position, the control arms are retained in the pivoted position by the platform. An ejection lever pivots the platform upward. At a predetermined pivoted position of the platform, the second control arm is released and the cassette is partially ejected out the loading receiver opening by the first control arm. A bumper is utilized to contact the cassette to prevent excessive ejection force.

15 Claims, 8 Drawing Figures

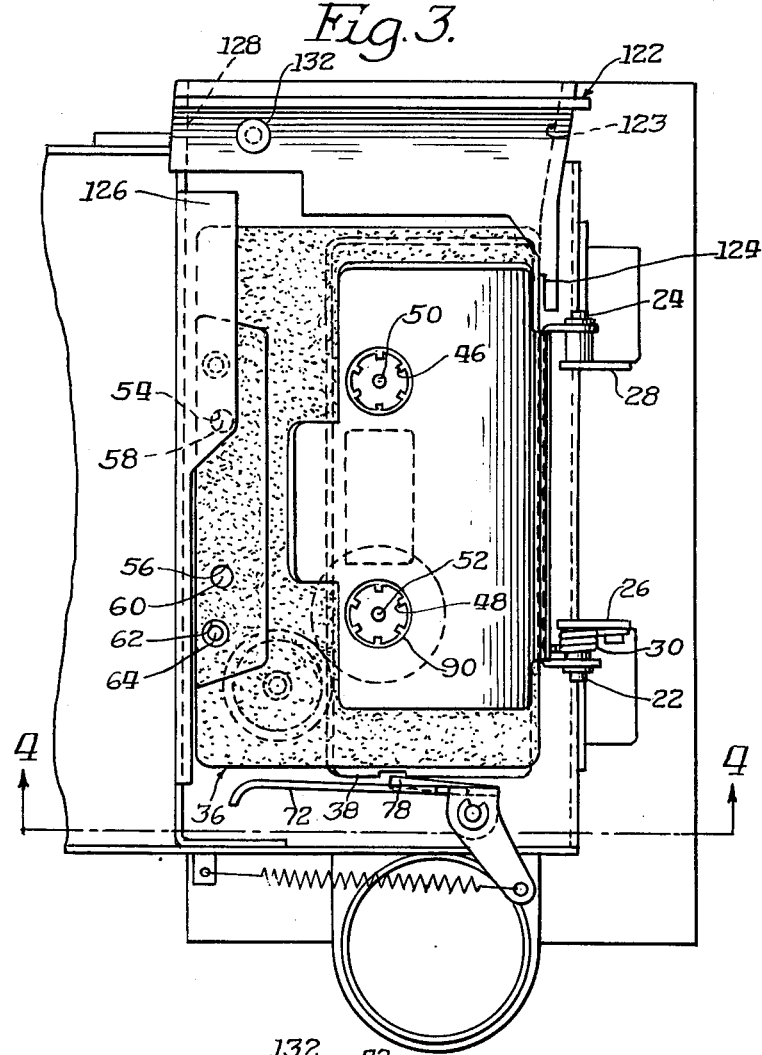
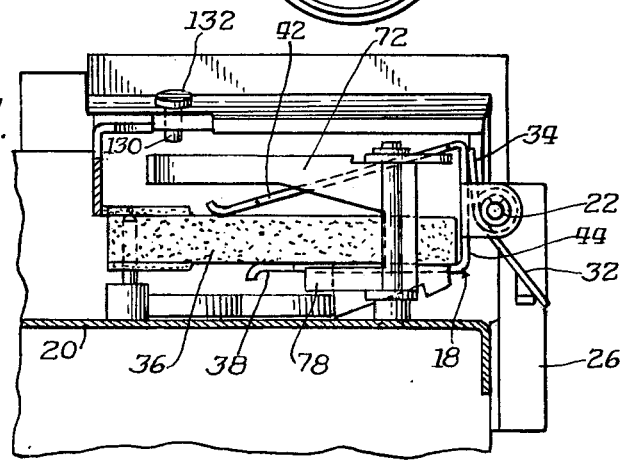

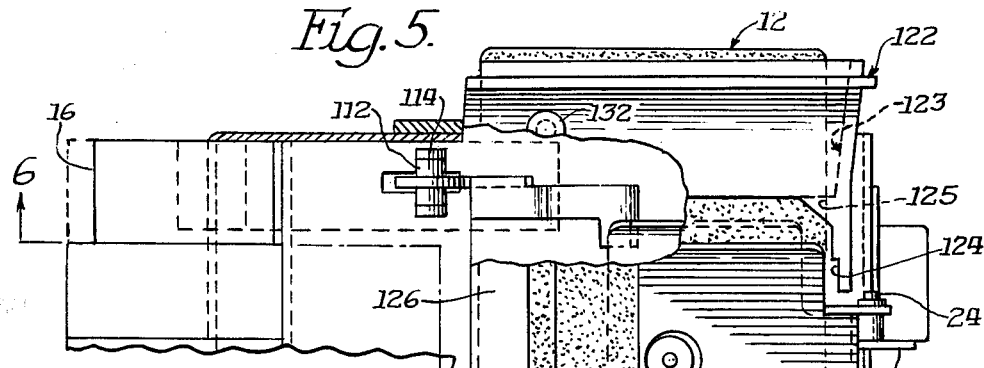
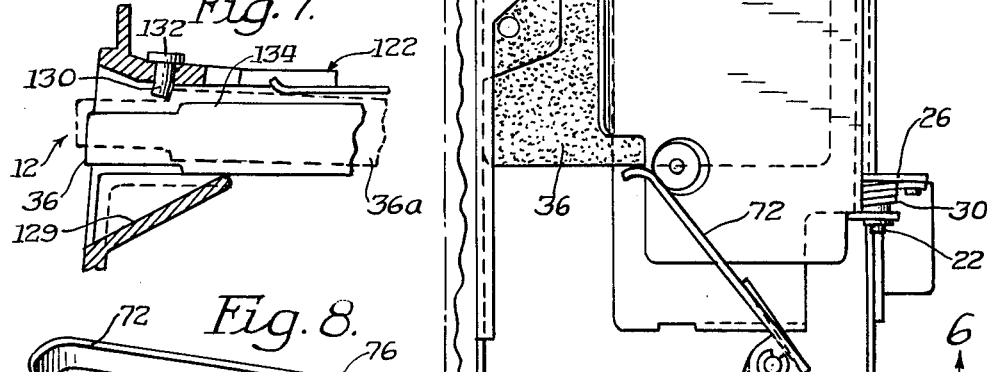
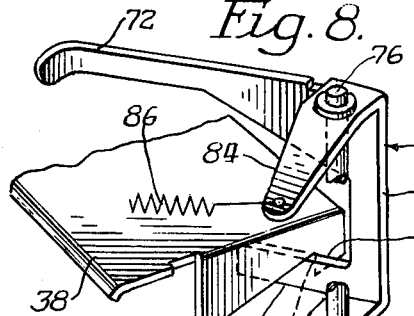
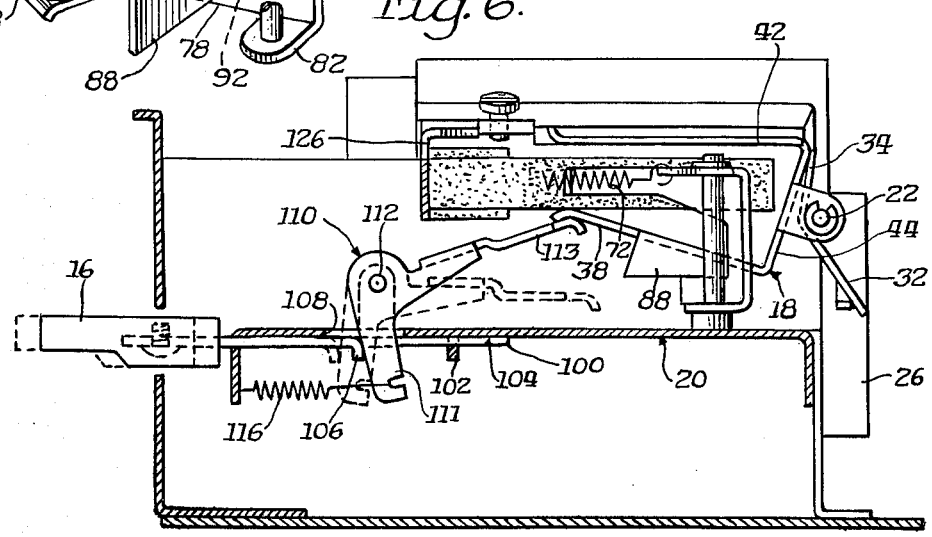

CASSETTE HANDLING APPARATUS WITH IMPROVED CONTROL ARRANGEMENT

BACKGROUND OF THE INVENTION

A. Field of the Invention

The present invention relates generally to the field of cassette tape players/recorders and more particularly to an improved edge loading cassette tape player/recorder with an improved cassette holder/loader and ejector/release control arrangement.

B. Description of the Prior Art

Various cassette tape players/recorders have been proposed by the prior art that utilize a cassette holder that is movable between a loading/unloading position and an operative position for the recording and playback of the cassette tape. Further, prior art arrangements have also proposed edge loading arrangements for a cassette wherein the narrow end of the cassette is inserted into the cassette player/recorder.

For example, U.S. Pat. No. 3,586,336 to Rosenblatt discloses a cassette player/recorder including a pivotal cassette holder into which the cassette is edge loaded, narrow end first. The holder is pivoted to the operative position for playback and recording.

U.S. Pat. No. 3,807,653 to Van Der Maaden is directed to a cassette player/recorder including a cassette loader/holder which is arranged to move in a direction parallel to itself between an inoperative position and an operative position with the cassette being loaded edgewise. An ejection arm arrangement is pivoted upon insertion of the cassette to ultimately release the holder from the loading position and move it to the operative position. An additional latch arrangement for the holder is released by spring action of the ejection lever during a return movement opposite to the insertion direction of the cassette. Upon return of the holder to the inoperative position, the ejection arm is released to partially eject the cassette cartridge from the holder for removal. An ejection control moves a hinged lever of the operating structure for the holder to return the holder to the inoperative position.

U.S. Pat. No. 3,635,423 to Lennie is directed to a cassette player/recorder having a cassette cartridge holder that is pivotally movable between a loading position and an operative position. The take-up and supply spindles extend upwardly from the base and the drive spindle extends downwardly from the top of the player/recorder. The cassette is diagonally inserted between the spindles.

U.S. Pat. No. 3,146,316 to Knoth is directed to a tape handling device that moves vertically between two parallel loading and operative positions and includes a manually operable lever for causing movement of the loader between the loading and inoperative positions.

U.S. Pat. No. 3,988,779 to Leis is directed to an edge loading tape deck wherein a cassette is loaded by insertion of the long edge of the cassette and then tilted downward for operation.

U.S. Pat. No. 3,904,149 to Suzuki is directed to a cassette loading apparatus wherein the cassette is inserted into a holding frame and the holding frame is released and biased upward to the operative position by moving in a parallel sense with respect to the loading plane. A control lever operates a pivotally mounted lever to engage projections on the holding frame with the lever pivoting against the projections to move the holding frame to the loading position. A retention or latching lever is pivotally mounted on the housing independently of the movable cassette holder frame and is engaged by the cassette upon loading and releases the holding frame to the upper position.

U.S. Pat. No. 3,875,590 to Mandish is directed to a cassette handler including a movably mounted cassette well for reciprocative movement along a first linear axis. A carriage frame carries the cassette well in a second direction perpendicular to the first direction.

U.S. Pat. No. 3,996,618 to Suzuki is directed to a cassette holder for loading and vertically moving a cassette between engaged and disengaged positions.

U.S. Pat. No. 3,669,457 to Nozawa is directed to a cassette loading arrangement with a movable cassette loader positioned by two U-shaped parallel link bars that function as pivotal levers for achieving vertical movement of the cassette holder between unloaded and loaded positions.

U.S. Pat. Nos. 3,684,300 and 3,747,940 are directed to various ejection control arrangements for tape handling devices.

While the prior art arrangements discussed hereinbefore are generally suitable for their intended use, it would be desirable to provide an improved edge loading cassette holder/loader with a simplified ejector/release control arrangement.

It is another object of the present invention to provide a cassette holder/loader arrangement including a pivotally mounted holder/loader platform and a pivotal control device including two extending control arms, the first of the control arms being arranged to pivot in one direction to eject the cassette and being pivoted in the opposite direction in response to engagement by an inserted cassette to release the holder/loader platform from a loading position to an operative position, the second control arm holding the holder/loader in the loading position and releasing the holder/loader to the operative position as the first control arm is pivoted, the second control arm being retained in the pivoted position by the holder/loader in the operative position, an ejection lever pivoting the holder/loader out of the operative position and releasing the second control arm so as to pivot the first control arm to eject the cassette.

It is yet another object of the present invention to provide a cassette player/recorder including a movable holder/loader platform that cooperates with a pivotal ejector/release control that includes two extending control arm portions to position the holder/loader platform to an operative position from a loading position upon the insertion of a cassette, narrow end first, into the holder/loader platform and, in response to a manually operable ejection lever, the ejector/release control ejecting the cassette.

These and other objects of the present invention are effectively achieved by providing an edge loading cassette holder/loader for a cassette player/recorder with a simplified and improved ejector/release control arrangement. The cassette is loaded narrow end first through a loading receiver opening into a holder/loader platform. The ejector/release control arrangement includes a first pivotally mounted control arm that is biased to pivot the arm to partially eject the cassette for removal and that also functions as a release control member for the holder/loader platform. The ejector/release control arrangement also includes a second pivotally mounted control arm that functions as a release member for the holder/loader platform and that is spaced apart from and moves coordinately with the first arm. The holder/loader platform is pivotally movable between an upper loading position and a lower cassette transport operative position wherein the cassette hub sprockets are engaged by transport drive spindles. The holder/loader platform is biased to the lower operative position. The upper loading position of the holder/loader platform is achieved by the engagement of the holder/loader platform in the upper position by the second control arm. As the cassette is inserted into the holder/loader platform, the cassette engages the first control arm and pivots the first and second control arms until the second control arm releases the holder/loader platform to the lower operative position. In the operative position, the first and second control arms are retained in the pivoted position by the holder/loader platform. A manually operable ejection lever pivots the holder/loader platform upward. At a predetermined pivoted position of the holder/loader platform, the second control arm is released and the cassette is partially ejected out the loading receiver opening by the first control arm. A deformable bumper is appropriately positioned to extend downwardly from the top of the loading receiver opening to selectively contact the cassette to prevent excessive ejection force and motion of the ejected cassette.

BRIEF DESCRIPTION OF THE DRAWINGS

The invention, both as to its organization and method of operation, together with further objects and advantages thereof, will best be understood by reference to the following specification taken in connection with the accompanying drawings in which:

FIG. 3 is a plan view of the cassette holder/loader of FIG. 1 illustrating an inserted cassette in the loaded operative position;

FIG. 4 is an elevational view partially in section taken from the line 4—4 of FIG. 3;

FIG. 5 is a plan view of the cassette holder/loader of FIG. 1 with portions cut away and illustrating the cassette in a partially ejected position;

FIG. 6 is an elevational view partly in section taken from the line 6—6 of FIG. 5;

FIG. 7 is a sectional view taken from the line 7—7 of FIG. 1 and illustrating the loading receiver opening of the cassette holder/loader; and FIG. 8 is an enlarged perspective view of portions of the cassette holder/loader platform and the ejector/release control arrangement of FIG. 1.

DETAILED DESCRIPTION OF A PREFERRED EMBODIMENT

Figure 1:
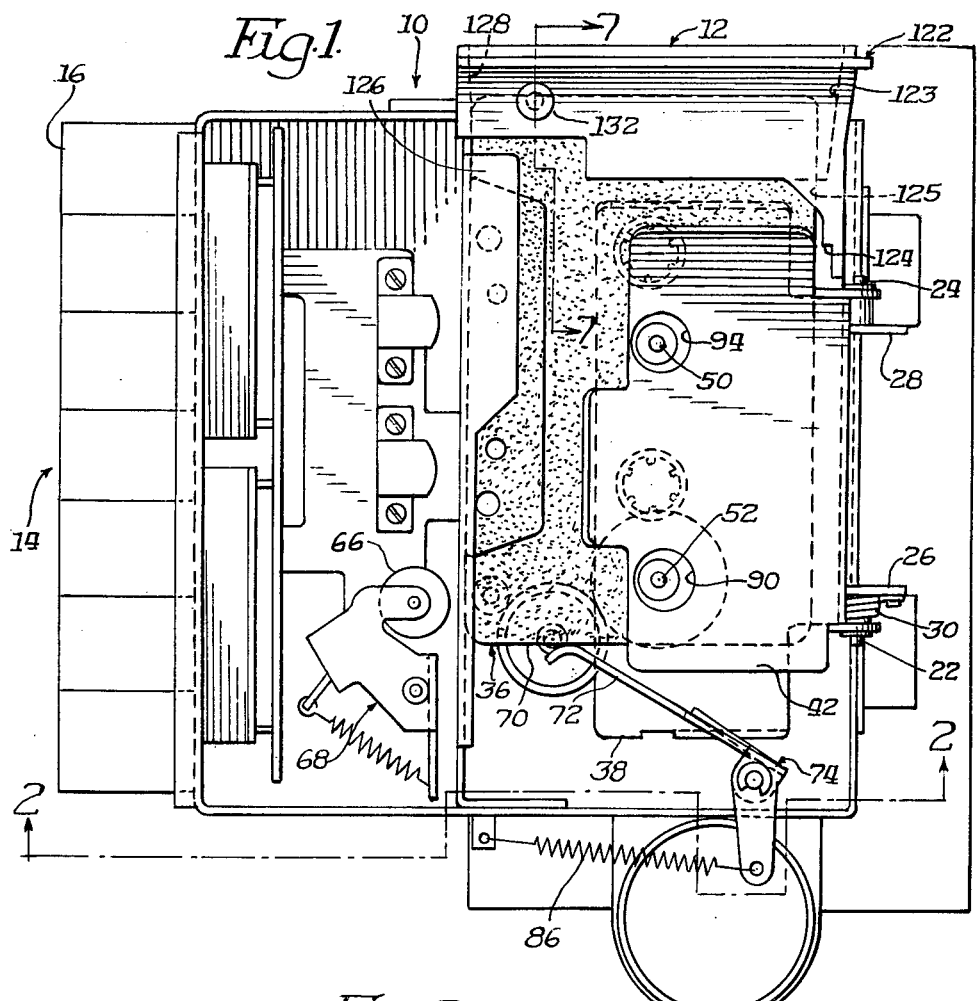
FIG. 1 is a plan view of the cassette holder/loader in accordance with the principles of the present invention and illustrating a cassette in a partially inserted position.

Referring now to FIG. 1, the cassette player/recorder 10 of the present invention includes a cassette receiver opening generally referred to at 12 for the insertion of a conventional cassette 36 of the type including two winding spools and a magnetic recording tape. The narrow end of the cassette 36 is inserted first into the cassette receiver opening 12. The cassette player/recorder 10 includes a number of pushbutton controls referred to generally at 14 for providing control functions such as record, play, stop tape transport, etc. The pushbutton controls 14 also include an eject function controlled by an ejection control pushbutton 16 to control the ejection of an inserted cassette from the cassette player/recorder 10 as will be explained in more detail hereinafter.

Figure 2:
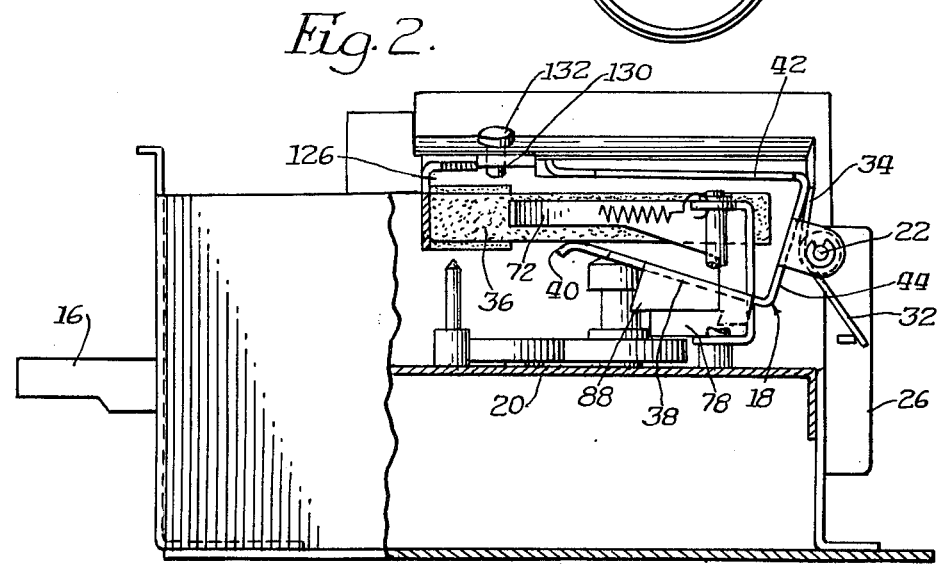
FIG. 2 is an elevational view partially in section taken generally from the line 2—2 of FIG. 1.

Referring now additionally to FIG. 2, the cassette player/recorder 10 includes a holder/loader assembly referred to generally at 18 that is pivotally mounted with respect to the frame 20 of the cassette player/recorder 10. Specifically, the holder/loader assembly 18 is pivotally mounted by means of pivot pins 22, 24 extending through respective apertures formed in upstanding frame arms 26, 28 respectively. The holder/loader assembly 18 is biased to an upper loading position as shown in FIG. 2 by means of a spring 30 disposed about the pivot pin 22 and having free spring ends 32, 34. The spring end 32 engages an extending tab provided on the upstanding frame arm 26 and the spring end 34 acts against the holder loader assembly 18.

In the loading position of FIG. 2, the holder/loader assembly 18 is arranged to accept and hold an inserted cassette 36 upon insertion through the cassette receiver opening 12. The holder/loader assembly 18 is a generally U-shaped arrangement including a lower generally planar shaped support platform 38 which supports the lower edge of the cassette 36 at the leading edge 40 of the platform 38 in the loading position. The holder/loader assembly 18 also includes an upper generally planar shaped guide platform 42 and a connecting portion 44 that forms the bight of the U and connects the upper and lower platforms 42, 38.

As can be seen in FIG. 2, in the loading position for insertion of the cassette 36, the upper guide platform 42 is approximately parallel to the top planar surface of the cassette 36 and the lower support platform 38 forms an acute angle with respect to the bottom planar surface of the cassette 36.

Referring now to FIG. 4, the holder/loader assembly 18 is pivotal to a lower transport operative position wherein the cassette 36 is moved vertically downward to an operative position with respect to the drive mechanisms of the cassette player/recorder 10 with the lower support platform 38 being parallel to and in contact with the lower planar surface of the cassette 36. Further, since the lower support platform 38 and the upper platform 42 are rigidly fixed with respect to each other, the upper guide platform 42 in the lower pivoted operative position now forms an acute angle with respect to the upper planar surface of the cassette 36.

Referring now to FIG. 3, in the lower cassette transport operative position illustrated in FIGS. 3 and 4, the cassette 36 is positioned with the cassette sprocket hubs 46, 48 in operative contact with the drive transport spindles 50, 52 respectively of the cassette player/recorder 10. The two guide apertures 54, 56 of the cassette 36 are positioned over two alignment pins 58, 60 respectively extending from the frame 20 of the cassette player/recorder 10. Additionally, the idler alignment aperture 62 of the cassette 36 is aligned with and interfits with an idler pin 64 that is rotatably mounted on the frame 20. When a play or transport control of the controls 14 is actuated, the capstan 66 is brought into engagement with the tape of the cassette 36 with the tape being driven between the capstan 56 and the idler pin 64. The capstan 56 is mounted on a pivotal control mechanism 68 (FIG. 1) and is pivoted into the drive transport position upon actuation of the controls 14 in the play mode.

Referring now again to FIG. 1 and considering the insertion and loading of the cassette 36, as the cassette 36 is inserted for loading by the user through the cassette receiver opening 12, the leading edge 70 of the cassette 36 engages a first control arm 72 of a pivotally mounted ejector/release control arrangement generally referred to at 74. Referring now additionally to FIG. 8, the ejector/release control arrangement 74 is pivotally mounted with respect to the frame 20 about a pin 76 fixed to the frame 20. The ejector/release control arrangement 74 includes the first control arm 72, a second control arm 78, and a vertical connecting portion 80 that connects the spaced apart control arms 72, 78. The connecting portion 80 includes a lower extending tab 82 having an aperture formed therethrough for receiving the pin 76. Further, an extending arm 84 extends at approximately a right angle to the vertical connecting portion 80 and includes an aperture formed therethrough for receiving the pin 76. The ejector/release control arrangement 74 is biased by means of a spring 86 that is fixed at one end through an aperture of the extending arm 84 and attached to the frame 20 at the other end of the spring 86. The spring 86 biases the ejector/release control arrangement 74 in the clockwise direction in FIG. 1.

The first upper control arm 72 of the ejector/release control arrangement 74 functions as both the release control member for the holder/loader assembly 18 and also as an ejector for the cassette 36.

Considering first the function of the first upper control arm 72 as a release control member, as the cassette 36 is inserted as shown in FIG. 1, the first upper control arm 72 is engaged and pivots the ejector/release control arrangement 74 in a counterclockwise direction. The lower support platform 38 of the holder/loader assembly 18 includes a downwardly extending wall portion 88 (best seen in FIG. 8) having an upwardly inclined lower edge with respect to the plane of the lower platform 38 and a lower extending tab 90 at the rear edge thereof to form a notch 92. In the loading position of the holder/loader assembly 18, the second lower control arm 28 engages the notch 92 and maintains the holder/loader assembly 18 in the upper loading position in opposition to the bias of the holder/loader assembly 18. As the ejector/release control arrangement 74 is pivoted counterclockwise in FIG. 1 in response to engagement and movement by the cassette 36 upon insertion, the second lower control arm 78 moves along the bottom edge of the downwardly extending wall portion 88 of platform 38.

Upon full insertion of the cassette 36 to a predetermined loaded position wherein the cassette 36 is approximately aligned with the drive transport apparatus of the cassette/player/recorder 10, the first and second control arms 72, 78 of the ejector/release control arrangement 74 are pivoted to a position where the second lower control arm 78 moves out of engagement with the wall portion 88. As the second lower control arm 78 releases the holder/loader assembly 18, the holder/loader assembly 18 with loaded cassette 36 moves downward to the lower cassette transport operative position in accordance with the spring bias. Upon the release of the holder/loader assembly 18 to the lower cassette transport operative position, the cassette 36 is positioned in an operative relationship to the drive transport arrangement as discussed hereinbefore with the sprocket hub 46, 48 being respectively aligned with the drive transport spindle 50, 52. The lower platform 38 includes apertures 94, 96 formed therethrough of a predetermined diameter larger than the sprocket hubs 46, 48 with the apertures 94, 96 being coaxially aligned with the drive spindles 50, 52.

In the lower cassette transport operative position, as shown in FIGS. 3 and 4, the lower control arm 78 is engaged by the extending wall 88 and the ejector/release control arrangement 74 is retained in the counterclockwise pivoted position shown in FIG. 3.

After desired transport functions of the cassette 36 are accomplished such as playing or recording, the eject control 16 is manually operated by the user to effect an ejection of the inserted cassette 36.

Referring now to FIGS. 5 and 6, the eject control button 16 is fixed to a slideable link bar 100. The slideable link bar 100 is slidably mounted with respect to the frame 20 by means of a guide tab 102 extending from the frame 20. The link bar 100 is also slidably supported by means of an aperture formed through a downwardly extending frame portion of the frame 20 through which the bar 100 is disposed. The link bar 100 includes an elongated passageway 104 formed therethrough and a downwardly extending tab 106 provided at the end of the passageway 104 proximate the push button control 16. The frame 20 is provided with an elongated passageway 108 aligned over the passageway 104 off the link bar 100.

A pivotally mounted lifter arm 110 is provided that includes a first control arm 111 extending downwardly through the passageways 104 and 108. The pivotally mounted lifter arm 110 also includes a second lifter arm portion 113 that is positioned to engage the underside of the lower support platform 38 when the lifter arm 110 is positioned as shown in FIG. 6. The lifter arm 110 is pivotally mounted with respect to the frame 20 by means of a fixed guide pin 112 and a support bracket 114 (FIG. 5) fixed to the frame 20 and holding the pin 112. The pin 112 is positioned through an aperture in the lifter arm 110. The lifter arm 110 is biased to the position shown in phantom in FIG. 6 by means of a spring 116 connected between the frame 20 and a notched portion of the control arm 111. Thus, actuation of the ejection pushbutton 16 pivots the lifter assembly 110 from the portion shown in phantom in FIG. 6 to the operative lifting position shown in FIG. 6 with the lifter arm 113 lifting upward against the lower support platform 38.

As the holder/loader assembly 18 is pivoted by the lifter arm 113 to the position shown in FIG. 6, the second control arm 78 of the ejector/release control arrangement 74 is released by the downward extending wall portion 88 of the lower platform 38. With the control arm 78 released, the ejector/release control arrangement 74 pivots from the position shown in FIG. 3 in accordance with the spring bias to the ejecting position shown in FIG. 5. As the ejector/release control arrangement 74 pivots to the position shown in FIG. 5, the upper control arm 72 acts against the cassette 36 to partially eject the cassette 36 out the cassette receiver opening 12 for removal by the user. The holder/loader assembly 78 and the ejector/release control arrangement 74 after ejection of the cassette 36 are positioned as shown in FIGS. 5 and 6 in the loading position.

The cassette receiver opening 12 is provided by a guide passageway 123 of a molded housing 122 fixed to the frame 20. The guide passageway 123 is formed within the housing 122 with a generally rectangular cross-section to form the opening 12 having height and width dimensions that are a predetermined amount greater than the height and width of the cassette 36 to allow ease of insertion and removal of the cassette 36 while providing appropriate alignment of the cassette 36 into a holder/loader assembly 18. The depth of the defined guide passageway 123 is dimensioned to provide suitable guide surfaces for the insertion and alignment of the cassette 36. The guide passageway 123 also includes a rearwardly extending side wall 124 for further alignment and guidance of the rear side edge 125 of the cassette 36 upon insertion and loading. Additionally, the frame 20 includes a guide channel 126 extending along the length of an inserted cassette 36 and aligned with the front side edge 128 of the guide passageway 123. The guide passageway 123 also includes an inclined ramp surface at 129 to provide an enlarged opening at one side of the cassette receiver opening 12 to allow ease of access to a predetermined depth by a finger of the user to insert the cassette 36.

To prevent the possibility of the cassette 36 being ejected out the cassette receiver opening 12 with excessive ejection force and motion and referring now additionally to FIG. 7, a deformable limit bumper 130 is provided that extends into the cassette receiver opening 12 in a predetermined position and orientation. The bumper 130 is fabricated, for example, from an elastomeric material. The bumper 130 includes a widened head portion 132 and extends through an aperture formed through the housing 122. When a cassette 36 as shown in FIG. 7 is being loaded or ejected under normal conditions, the cassette top surface 134 does not contact the bumper 130. However, if a cassette during ejection assumes the position 36a during ejection, the top surface 128 of the cassette 36 contacts the bumper 130. The contact and deformation of the bumper 130 by the cassette reduces the momentum of the ejected cassette and ensures that the cassette will be partially ejected for removal by the user and will not be fully ejected so as to fall from the cassette player/recorder 10.

While there has been illustrated and described several embodiments of the present invention, it will be apparent that various changes and modifications thereof will occur to those skilled in the art. It is intended in the appended claims to cover all such changes and modifications as fall within the true spirit and scope of the present invention.

What is claimed as new and desired to be secured by Letters Patent of the United States is:

1. Apparatus for use with a cassette player/recorder comprising:

a frame defining a cassette receiving passage and a mounting plane for the mounting of operative components of a cassette player/recorder, said cassette receiving passage defining cassette receiving dimensions for the edge loading of a cassette therethrough;

cassette holder/loader means pivotally mounted with respect to said frame for movement between an upper loading position and a lower cassette transport operative position, said cassette holder/loader including a first support platform, said first support platform including two apertures provided therein for alignment with the cassette hubs of a conventional cassette when a cassette is loaded edgewise into said cassette holder/loader in a predetermined loading position, said cassette holder/loader including means for biasing said first support platform to a first lower operative position; and ejector/release control means responsive to a cassette being loaded into said cassette holder/loader means for controlling the position of said support platform and for selectively ejecting a cassette loaded into said cassette holder/loader means, said ejector/release control means comprising a first control arm pivotally mounted with respect to said frame, means for biasing said first control arm toward a cassette ejecting position, and a second control arm movable with said first control arm, said second control arm being disposed with respect to said first support platform so as to engage said first support platform and hold said first support platform in said upper loading position when said first control arm is in said cassette ejecting position, said first control arm being disposed with respect to said first support platform for engagement by the leading edge of an inserted cassette, said first and second control arms being pivoted toward a second release position as a cassette is inserted and loaded into said cassette holder/loader means, said first support platform being released to move to said lower cassette transport operative position when said first and second control arms are pivoted to said second release position and said second control arm disengages said first support platform, said second control arm being in engagement with said first support platform to hold said first and second control arms in said second release position when said first support platform is in said lower cassette transport operative position, said ejector release control means further comprising manually operable ejection means for pivoting said first support platform toward said upper loading position upon operation of said manually operable ejection means, said first and second control arms being released to pivot toward said cassette ejecting position as said first support platform is pivoted to release said second control arm from engagement by said first support platform, said first control arm acting against the leading edge of the cassette and pivoting to said cassette ejecting position to partially eject the cassette out said cassette receiving passage, said first and second control arms being extending planar portions of a common member.

2. The apparatus of claim 1 wherein said first and second control arms are disposed in a common plane and aligned vertically in a plane generally perpendicular to the plane of an inserted and loaded cassette.

3. The apparatus of claim 1 wherein said guide passageway is formed by a housing attached to said frame.

4. The apparatus of claim 1 wherein said first support platform is a generally planar member and in said upper loading position is positioned so as to form an acute angle with respect to the plane defined by an inserted cassette.

5. The apparatus of claim 4 wherein said first support platform when in said lower cassette transport operative position is generally parallel with the plane defined by a loaded cassette.

6. The apparatus of claim 4 wherein said cassette holder/loader means further comprises a second general planar guide platform spaced apart from said first support platform and pivotally movable with said first support platform, said second guide platform being disposed so as to be generally parallel to the plane of an inserted and loaded cassette when said cassette holder/loader means is in said loading position, a cassette when loaded into said cassette holder/loader means being disposed between said second guide platform and said first support platform, said second guide platform forming an acute angle with respect to said first support platform and spaced apart from said first support platform by a predetermined distance, said predetermined distance being equal to the sum of the thickness dimension of a conventional cassette plus a predetermined fraction of the thickness of a conventional cassette.

7. The apparatus of claim 1 wherein said first support platform is a generally planar member having a length dimension aligned with the longest dimension of a conventional cassette when the cassette is inserted and loaded into said cassette holder/loader means, the length dimension of said first support platform being approximately equal to the largest dimension of the cassette.

8. The apparatus of claim 1 wherein said first support platform is a generally planar member having a width dimension aligned with the short edge dimension of a cassette when the cassette is inserted and loaded into said cassette holder/loader means, said width dimension of said first support platform being substantially less than the width of the short edge dimension of a cassette, said first support platform and said cassette receiving passage being relatively disposed such that a cassette when loaded into said cassette holder/loader means in a predetermined orientation is arranged with the tape transport edge of the cassette overhanging and extending beyond said first support platform.

9. The apparatus of claim 1 further comprising cassette drive transport means carried by said frame, said cassette drive transport means including transport drive spindles that are disposed in said operative component plane and extending therefrom for operative engagement with the cassette hubs of a cassette loaded into said cassette holder/loader means when said cassette holder/loader means is moved to said lower cassette transport operative position.

10. The apparatus of claim 9 wherein said cassette drive transport means further comprises means and an idler pin disposed with respect to said operative plane for driving engagement with the tape of a loaded cassette when said cassette holder/loader means is moved to said lower cassette transport operative position.

11. The apparatus of claim 1 wherein said manually operable ejection means comprises an actuation lever and a pivotal member pivotally mounted with respect to said frame and arranged to be pivoted by engagement with said actuation lever, said pivoted member including a pivot arm for engaging the lower surface of said first support platform.

12. The apparatus of claim 1 wherein said cassette receiving passage is defined by a guide passageway formed through said frame and including guiding planar surfaces, said guiding planar surfaces being generally parallel to the plane defined by an inserted cassette and extending predetermined dimensions in a direction defined by the direction of insertion of a cassette through said cassette receiving passage.

13. The apparatus of claim 1 wherein said guide passageway includes an insertion access surface defined by an inclined ramp surface and defining a larger opening dimension at the entrance to said cassette receiving passage, said entrance being the portion of said guide passageway that is first encountered by the leading edge of an inserted cassette.

14. The apparatus of claim 1 wherein said first support platform includes means for interacting with said second control arm and for providing a limit to pivotal movement of said first and second control arms in said pivoted cassette ejection position.

15. The apparatus of claim 14 wherein said interacting means comprises an edgewall and a notch formed therein.

* * * * *